United States Patent [19]

Shigemasa et al.

[11] Patent Number: 4,539,633
[45] Date of Patent: Sep. 3, 1985

[54] DIGITAL PID PROCESS CONTROL APPARATUS

[75] Inventors: Takashi Shigemasa; Yoshinori Ichikawa, both of Yokohama, Japan

[73] Assignee: Tokyo Shibaura Denki Kabushiki Kaisha, Kawasaki, Japan

[21] Appl. No.: 503,310

[22] Filed: Jun. 10, 1983

[30] Foreign Application Priority Data

Jun. 16, 1982 [JP] Japan ................................. 57-102100
Sep. 25, 1982 [JP] Japan ................................. 57-166041
Sep. 25, 1982 [JP] Japan ................................. 57-166042

[51] Int. Cl.$^3$ ........................................... G05B 13/04
[52] U.S. Cl. ................................... 364/162; 364/157; 364/179; 318/561; 318/610
[58] Field of Search ............... 364/149, 150, 151, 157, 364/158, 159, 160, 161, 162, 163, 164, 165, 178, 179; 318/609, 610, 561, 636

[56] References Cited

U.S. PATENT DOCUMENTS

| 4,214,301 | 7/1980 | Kurihara et al. | 364/119 |
| 4,368,510 | 1/1983 | Anderson | 364/162 X |
| 4,407,013 | 9/1983 | Arcara et al. | 364/162 X |
| 4,451,878 | 5/1984 | Shigemasa | 364/162 X |
| 4,466,054 | 8/1984 | Shigemasa et al. | 364/162 |
| 4,481,567 | 11/1984 | Kaya et al. | 364/162 X |

FOREIGN PATENT DOCUMENTS 0045857 2/1982 European Pat. Off.
2086082 5/1982 United Kingdom.

OTHER PUBLICATIONS

IEEE Transactions on Automatic Control, Dec. 1976, pp. 837-840, New York, US; R. Soderstrom et al.

Primary Examiner—Jerry Smith
Assistant Examiner—Allen MacDonald
Attorney, Agent, or Firm—Oblon, Fisher, Spivak, McClelland & Maier

[57] ABSTRACT

A digital PID process control apparatus is proposed wherein dynamic characteristics of the process are identified by supplying a persistently exciting signal to a closed-loop control system, and the persistently exciting signal is not supplied to the system after identification is completed, thereby tuning PID control parameters in accordance with the identified pulse transfer function. The control apparatus has a detector for detecting model error of the process in operation, a pulse generator for superposing a pulse signal on a set-point signal to the process when the model error is detected, a calculator for detecting a transient change in the model error when the input signal to the process changes in a pulse form, and a restart circuit for restarting generation of the persistently exciting signal when a change in the model error is detected, and for restarting an identification/tuning function.

8 Claims, 9 Drawing Figures

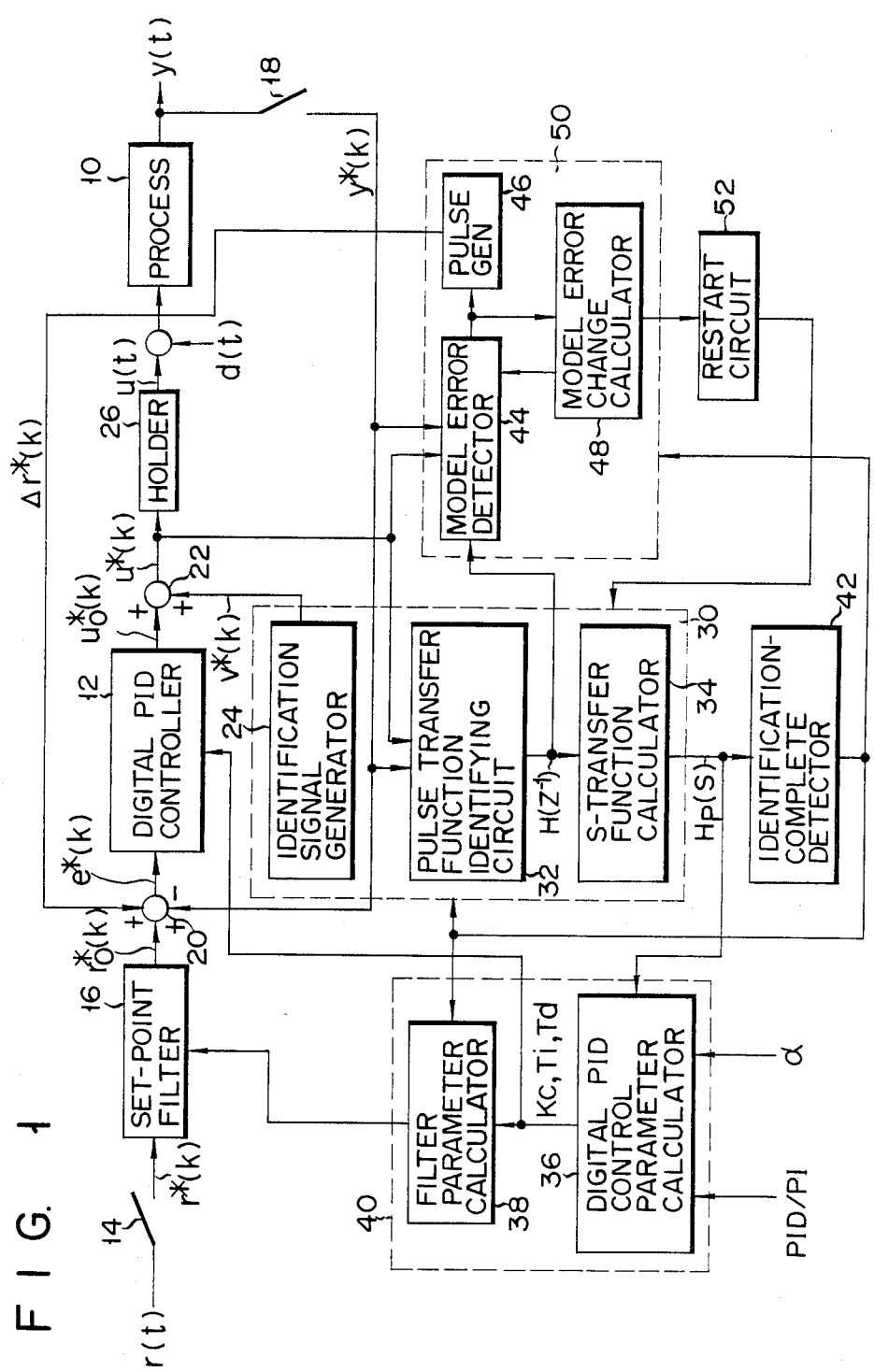
F I G. 1

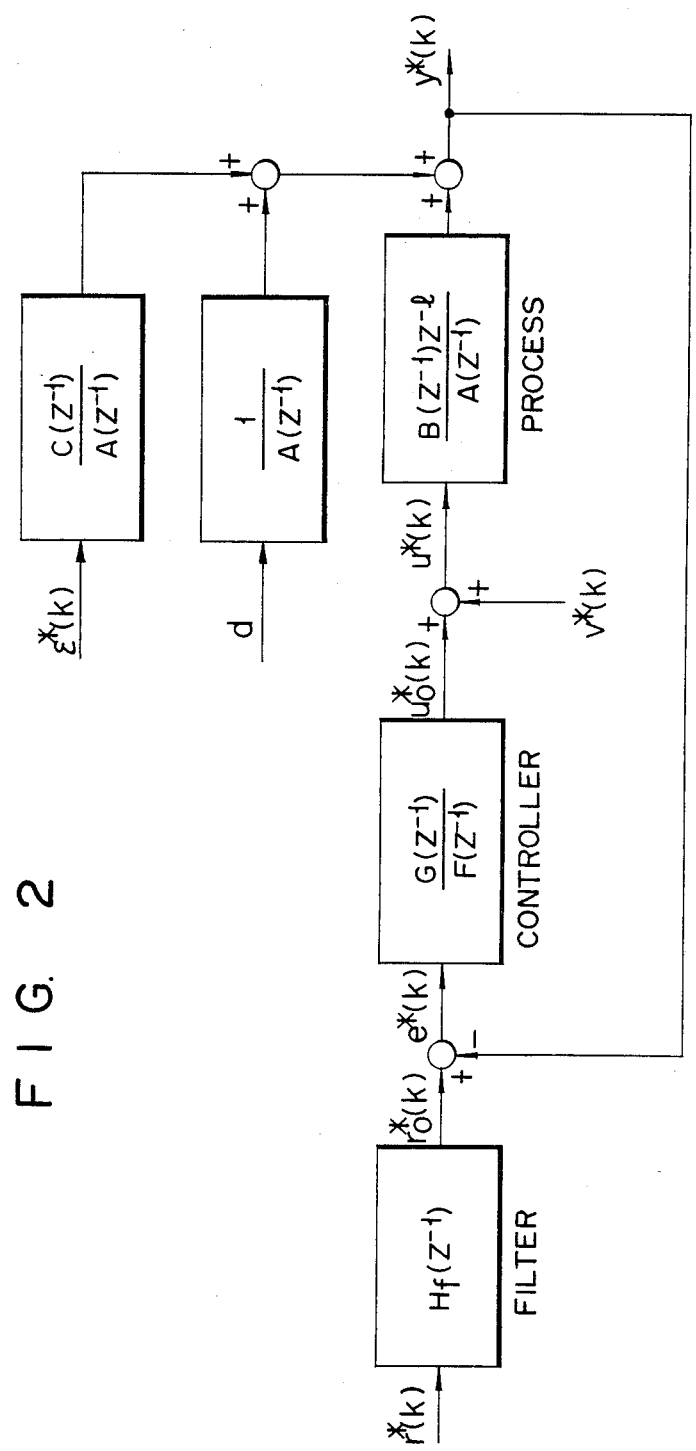

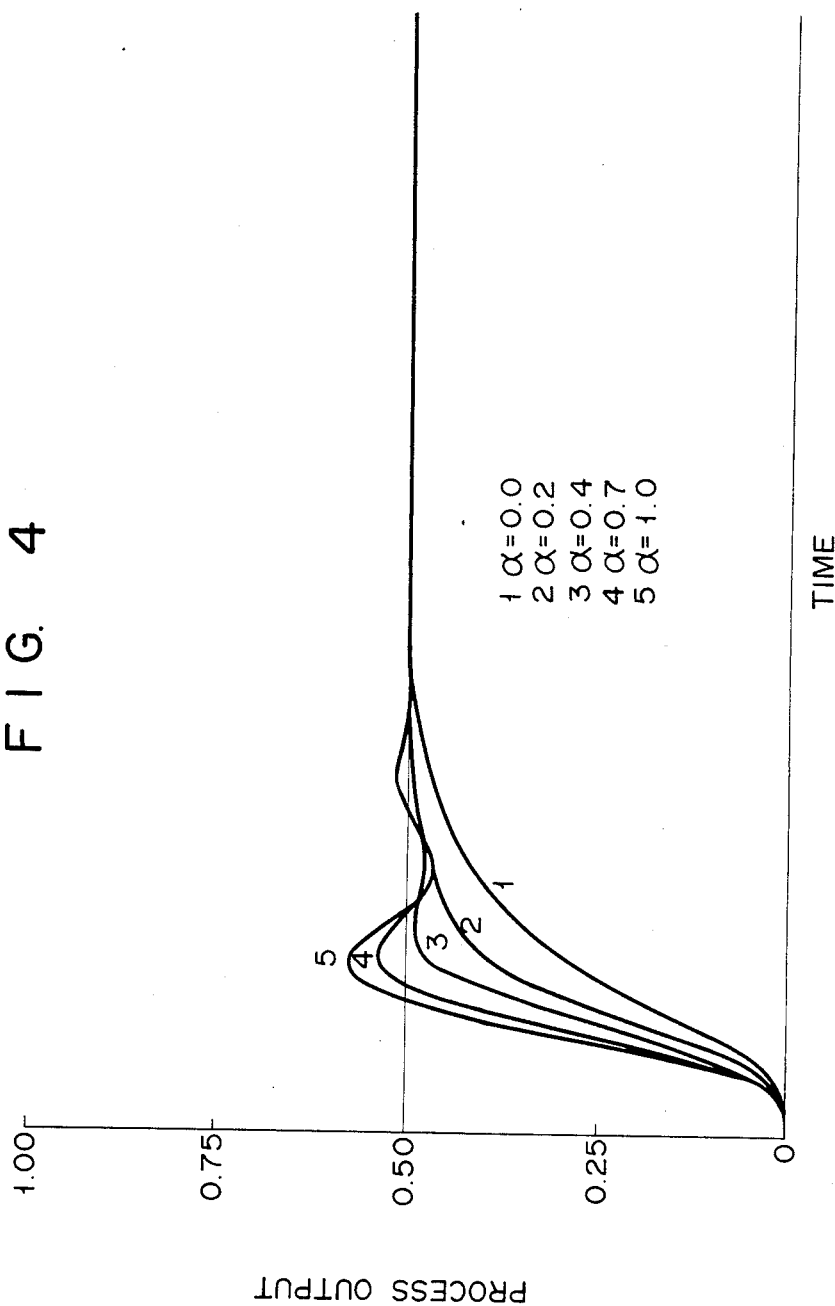

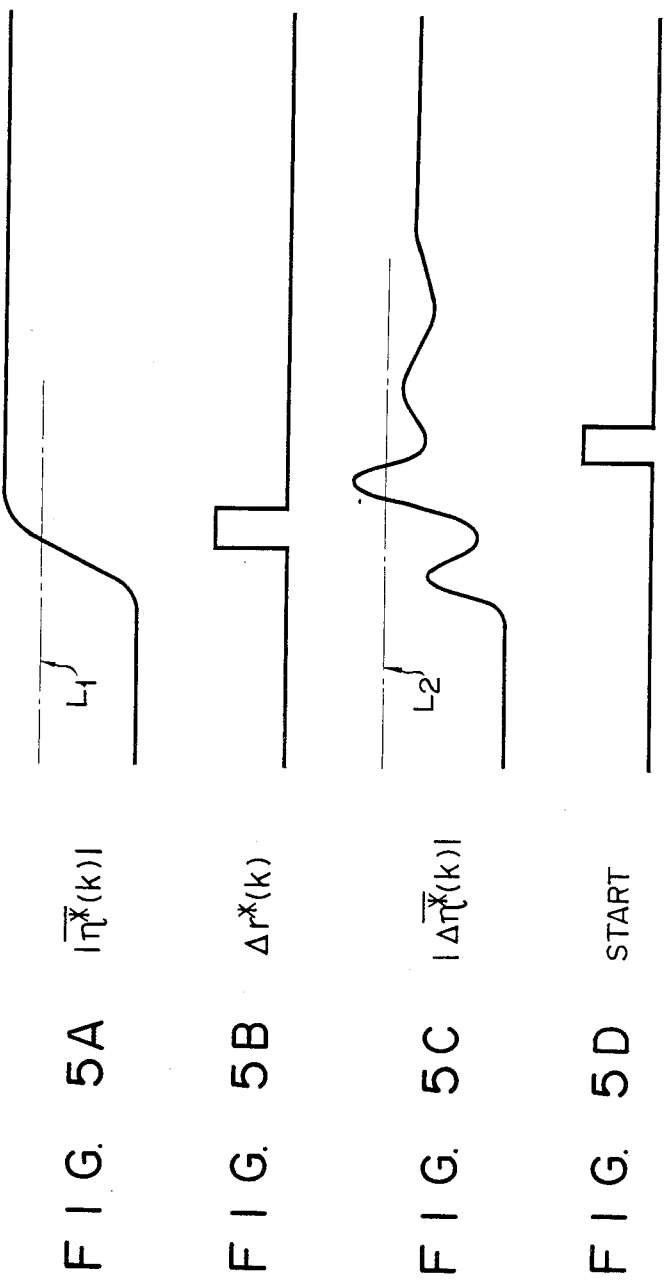

DIGITAL PID PROCESS CONTROL APPARATUS

BACKGROUND OF THE INVENTION

The present invention relates to a digital PID (P: Proportional, I: Integral, D: Derivative) process control apparatus having auto tuning function.

A process control apparatus in general use is a PID controller. In the known PID controller, PID control parameters are determined by an operator from the input and output data of a process which he has observed. These PID control parameters are manually input by the operator. This manual inputting of parameters is extremely difficult and considerably time-consuming.

Another PID controller is known which automatically tunes process parameters to optimal values in accordance with the dynamic characteristics of the process. To identify the dynamic characteristics of the process, it is necessary to greatly change control signals to be input to the process. Therefore, the automatic tuning of PID control parameters cannot be performed at all times. This is why the automatic tuning is manually started by an operator in the conventional automatic tuning PID controller. To achieve a correct start of automatic tuning, the operator must supervise changes in dynamic characteristics of the process. Supervising such changes is a cumbersome and time-consuming operation. Furthermore, expensive equipment such as a recorder and indicating devices must be provided for supervising, resulting in inconvenience. Since changes in the dynamic characteristics of the process must be monitored by the operator so as to identify the need to restart automatic tuning, good tuning cannot be performed. Furthermore, the operator may not notice the changes in dynamic characteristics of the process. In this case, product quality and plant efficiency are degraded, and the safety of the plant may not be guaranteed. In this manner, in the conventional process control apparatus, once the dynamic characteristics of the process are identified at the beginning, these characteristics cannot be basically retuned, thus giving rise to a lack of flexibility.

SUMMARY OF THE INVENTION

It is an object of the present invention to provide a digital PID process control apparatus for automatically tuning digital PID control parameters in accordance with identification results obtained by identifying the dynamic characteristics of a process controlled in a closed loop, wherein changes in process dynamic characteristics are detected, and automatic tuning of the digital PID control parameters is restarted so as to constantly control the process in accordance with optimum control parameters.

In order to achieve the above and other objects of the present invention, there is provided a digital PID process control apparatus comprising a digital PID controller for calculating a control signal as a process input signal in accordance with PID control parameters and a difference between a set-point signal and a process signal as a process output signal so as to supply the control signal to a process, an identifying section for identifying a pulse transfer function of the process in accordance with the process output signal and the process input signal by supplying a persistently exciting signal as an identification signal and for calculating an S-transfer function of the process in accordance with the identified pulse transfer function, a tuning section for calculating the PID control parameters of the digital PID controller in accordance with the S-transfer function, an identification-complete detection section for detecting a convergence of the S-transfer function and stopping generation of the persistently exciting signal, a process change detection section for detecting a model error of the process in accordance with the process input signal, the process output signal and the pulse transfer function and for changing the set-point signal in a pulse form, and a restart section for detecting a change in the model error when the set-point signal is changed in the pulsed form and for restarting generation of the persistently exciting signal for the identification section.

According to the present invention, the PID control parameters are returned by detecting a change in the dynamic characteristics of the process. Therefore, optimum process control is automatically performed over a period of time.

BRIEF DESCRIPTION OF THE DRAWINGS

FIG. 1 is a block diagram of a digital PID process control apparatus according to an embodiment of the present invention;

FIG. 2 shows a model of a closed-loop control system used to identify the process dynamic characteristics;

FIG. 4 is a graph showing a response shape of the control system when the response shape parameter is changed; and FIGS. 5A to 5D are timing charts for explaining restart of the identification/tuning function when the dynamic characteristics of the process are changed.

DETAILED DESCRIPTION OD THE PREFERRED EMBODIMENT

Figure 3A:
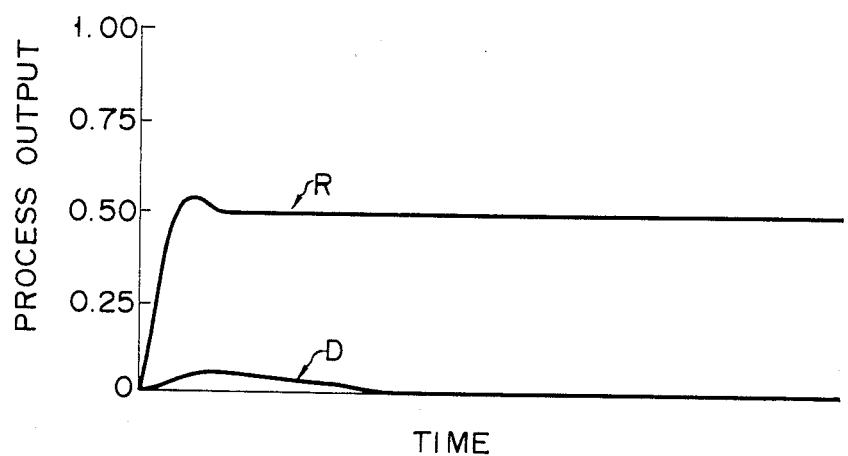
FIGS. 3A and 3B are respectively graphs for explaining a response to a set point and a response against a disturbance, with reference to the conventional digital PID process control apparatus and the digital PID process control apparatus of the present invention.

A digital PID process control apparatus according to an embodiment of the present invention will be described with reference to the accompanying drawings. FIG. 1 is a block diagram of the digital PID process control apparatus according to the embodiment of the present invention. A process 10 to be controlled is a plant such as a steel plant and a chemical plant. The variables to be directly controlled are temperatures, pressures, flow rates, liquid levels, and so on of the plant. A process output signal (to be referred to as a process signal) y(t) indicates the variable to be controlled. The purpose of the process control is to control the process signal y(t) with a set-point signal r(t). The process 10 together with a digital PID controller 12 constitutes a closed-loop control system. The set-point signal r(t) is sampled by a sampler 14 at a sampling period $\tau$ to obtain a discrete set-point signal r*(k). The discrete set-point signal r*(k) is then filtered by a set-point filter 16. The filter 16 produces a signal $r_0$*(k). It should be noted that reference symbol t ($=k\tau$) denotes real time where k is the discrete time. Meanwhile, the process signal y(t) is supplied to a sampler 18 which is synchronized with the sampler 14. The sampler 18 produces a discrete process signal y*(k). An adder 20 produces a control error signal e*(k) ($=r_0$*(k)$-$y*(k)). The control error signal e*(k) is supplied to the digital PID controller 12. The digital PID controller 12 produces a control signal $u_0^*(k)$ supplied to the process 10 (i.e., the process signal) so as to control the process signal $y(t)$ with the set-point signal $r(t)$ in accordance with a velocity type digital PID control algorithm using the control error signal $e^*(k)$ and the digital PID control parameters Kc, Ti and Td. The control signal $u_0^*(k)$ is added by an adder 22 to a persistently exciting signal $v^*(k)$ from an identification signal generator 24. The adder 22 produces a control signal $u^*(k)$ ($=u_0^*(k)+v^*(k)$). The control signal $u^*(k)$ is then supplied to a 0th-order holder 26 which then produces a real-time control signal $u(t)$. This control signal $u(t)$ is supplied to the process 10. A transfer function of the holder 26 is defined as $(1-e^{-\tau s})/s$. In addition to the control signal $u(t)$, a disturbance may be supplied to the process 10, where the disturbance is designated by $d(t)$. The circuit arrangement described above constitutes a closed-loop control system.

An identification/tuning system will now be described wherein the dynamic characteristics of the process under closed-loop control are identified and the PID control parameters Kc, Ti and Td of the digital PID controller 12 are tuned in accordance with the identification results. An identification section 30 comprises the identification signal generator 24, a pulse transfer function identifying circuit 32, and an S-transfer function calculator 34. In order to satisfy the identifiability conditions (e.g., as described by T. Söderström, L. Ljung and I. Gustavsoon: Identifiability Conditions for Linear Multivariable Systems Operating under Feedback, IEEE Trans. Act. Control AC-21, 1976) of the dynamic characteristics of a process controlled in a closed loop, the identification signal generator 24 supplies a persistently exciting identification signal $v^*(k)$ to the closed-loop control system. The input and output signals (i.e., the control signal $u^*(k)$ and the process signal $y^*(k)$) of the process 10 are supplied to the pulse transfer function identifying circuit 32. The circuit 32 calculates a pulse transfer function $\hat{H}(z^{-1})$ using an algorithm of recursive extended least squares (RELS). The pulse transfer function $\hat{H}(z^{-1})$ is supplied to the S-transfer function calculator 34. The S-transfer function calculator 34 calculates an S-transfer function $H_p(s)$ in denominator polynomial expression, by substituting the pulse transfer function $\hat{H}(z^{-1})$ by $z=\exp(\tau S)$ and by multiplying the result of this substitution by a correction term. A digital PID control parameter calculator 36 as the tuning section calculates the digital PID control parameters Kc, Ti and Td by matching the S-transfer function of the reference model with the S-transfer function which is calculated using the S-transfer function from the disturbance $d(t)$ to the process signal $y(t)$. These parameters are supplied to the digital PID controller 12. The PID controller can perform not only PI control action but also the PID control action. For this reason, a mode selection signal PID/PI is supplied to the digital PID control parameter calculator 36. Calculation operation is performed in accordance with the selected mode. The S-transfer function of the reference model is determined so that the response shape, i.e., overshoot may be adjusted by changing a response shape parameter $\alpha$. The parameter $\alpha$ is also supplied to the digital PID control parameter calculator 36. The digital PID control parameters Kc, Ti and Td are also supplied to a filter parameter calculator 38. The filter parameter calculator 38 generates a filter parameter of the set-point filter 16, with which the S-transfer function of the reference model matches with the S-transfer function from the set-point signal $r(t)$ to the process signal $y(t)$, using the PID control parameters Kc, Ti and Td. Here, the reference model is the same as that used for obtaining the PID control parameters. However, another model may be used in place of the above model. The PID control parameter calculator 36 and the filter parameter calculator 38 constitute a tuning section 40.

The S-transfer function $H_p(s)$ is also supplied to an identification-complete detector 42. The detector 42 detects the end of identification in accordance with the convergence of the S-transfer function $H_p(s)$. When the end of identification is detected, a detection signal is supplied to the identification section 30, so that the persistently exciting signal is no longer generated and the operation of the identifying circuit 32 is stopped. Thereafter, the process control parameters Kc, Ti and Td do not change. The detection signal from the identification-complete detector 42 is also supplied to the filter parameter calculator 38. The calculation of filter parameter is started in accordance with the detection signal.

In this embodiment, changes in the dynamic characteristics of the process are detected using the model error. However, model error also occurs when a disturbance is applied to the process in addition to the case wherein the dynamic characteristics of the process change. However, when the set-point signal changes in a pulse form, the response of the model error differs in the case where the dynamic characteristics of the process change and in the case where only a disturbance is supplied. In particular, when the set-point signal is changed in a pulsed manner in the case of changes in process dynamic characteristics, the model error transiently changes by a large magnitude. However, when only the disturbance is applied, the model error does not change. It should be noted that the model error is a signal obtained by subtracting the actual process output signal from the predicted process output signal generated by using the identified pulse transfer function. The process signal $y^*(k)$, the control signal $u^*(k)$, and the pulse transfer function $H(z^{-1})$ are supplied to a model error detector 44. A model error signal is supplied to a pulse generator 46, and a model error change calculator 48. An output signal $\Delta r^*(k)$ from the pulse generator 46 is added by the adder 20 to the control error signal $e^*(k)$. The model error detector 44, the pulse generator 46 and the model error change calculator 48 constitute a process dynamic characteristic change detection section 50. When a transient change in the model error is detected after the pulse generator 46 generates the pulse, the identification section 30 is restarted by a restart circuit 52. In other words, the persistently exciting signal is generated again, and the operation of the identifying circuit 32 is restarted. The characteristic change detection section 50 is started in accordance with the detection signal from the identification-complete detector 42.

The operation of the digital PID process control apparatus according to the embodiment of the present invention will now be described hereinafter. When this apparatus is connected to the process 10 in operation, the persistently exciting signal $v^*(k)$ is supplied from the identification signal generator 24 to the system. A maximum period sequence signal (to be referred to as an M-sequence signal) generated by a simple algorithm is used as the persistently exciting signal. If the period is given as 127, the M-sequence signal v*(k) is given as follows:

$$m^*(k) = \text{MOD}[m^*(k-1) + m(k-7), 2] \quad (1)$$

$$v^*(k) = \text{AM} \cdot \{2m^*(k) - 1\} \quad (2)$$

where MOD [X, 2] is the X modulo 2 and AM is the amplitude.

Meanwhile, the digital PID controller 12 produces the control signal $u_0^*(k)$ for each sampling period as follows:

$$u_0^*(k) = u_0^*(k-1) + \Delta u_0^*(k) \quad (3)$$

$$\Delta u_0^*(k) = Kc\{(e^*(k) - e^*(k-1)) + (\tau/Ti)e^*(k) + (Td/\tau)(e^*(k) - 2e^*(k-1) + e^*(k-2))\} \quad (4)$$

for $e^*(k) = r_0^*(k) - y^*(k) + \Delta r^*(k)$

Now assume that the signal $\Delta r^*(k)$ is not generated. The control signal $u^*(k)$ supplied to the process 10 is given as $u_0^*(k) + v^*(k)$. The pulse transfer function identifying circuit 32 calculates the pulse transfer function $\hat{H}(z^{-1})$ which indicates the dynamic characteristics of the process 10, using the control signal $u^*(k)$ and the process signal $y^*(k)$, in accordance with the recursive extended least squares (RELS) algorithm. The model of the closed-loop control system is given as shown in FIG. 2, where $\epsilon^*(k)$ is the white noise given as follows:

$$E[\epsilon^*(k)] = 0 \quad (5)$$

$$E[\epsilon^*(k) \cdot \epsilon^*(m)] = \sigma_\epsilon^2 \cdot \sigma_{k,m} \quad (6)$$

where E[X] is the expectation of X.

The model of the process in FIG. 3 can be expressed as follows:

$$y^*(k) = \{\hat{B}(z^{-1})/\hat{A}(z^{-1})\} \cdot z^{-l} \cdot u^*(k) + \{\hat{C}(z^{-1})/\hat{A}(z^{-1})\} \cdot \xi(k) + \hat{d}/\hat{A}(z^{-1}) \quad (7)$$

$$\hat{A}(z^{-1}) = 1 + \hat{A}_1 z^{-1} + \ldots + \hat{A}_{na} z^{-na} \quad (8)$$

$$\hat{B}(z^{-1}) = \hat{b}_1 z^{-1} + \ldots + \hat{b}_{nb} z^{-nb} \quad (9)$$

$$\hat{C}(z^{-1}) = 1 + \hat{c}_1 z^{-1} + \ldots + \hat{c}_{nc} z^{-nc} \quad (10)$$

where l is the discrete time delay, and $\xi(k)$ is the prediction error signal having the following characteristics:

$$E[\xi(k)] = 0 \quad (11)$$

$$E[\xi(k) \cdot \xi(m)] = \sigma_\xi^2 \cdot \sigma_{k,m} \quad (12)$$

According to equation (7), the identification value $\hat{H}(z^{-1})$ of the pulse transfer function $H(z^{-1})$ of the process is given as $\hat{B}(z^{-1})z^{-l}/\hat{A}(z^{-1})$. The pulse transfer function can be calculated by identifying unknown parameters $\hat{a}_1$ to $\hat{a}_{na}$, $\hat{b}_1$ to $\hat{b}_{nb}$, $\hat{c}_1$ to $\hat{c}_{nc}$, and d. It should be noted that d is the coefficient concerning the DC value.

In the RELS algorithm, the process model expressed by equation (7) is modified to obtain these unknown parameters as follows:

$$y(k) = \phi^T(k) \cdot \hat{\theta} + \xi(k) \quad (13)$$

where T is the transpose. A vector $\phi(k)$ is given as follows:

$$\phi^T(k) = [-y^*(k-1), \ldots, -y^*(k-na), \quad (14)$$
$$u^*(k-l-1), \ldots, u^*(k-l-nb),$$
$$\xi(k-1), \ldots, \xi(k-nc), 1]$$

The unknown parameter vector $\theta$ is given as follows:

$$\hat{\theta}^T = [\hat{a}_1, \hat{a}_2, \ldots, \hat{a}_{na}, \hat{b}_1, \hat{b}_2, \ldots, \hat{b}, \hat{c}_1, \hat{c}_2, \ldots, \hat{c}_{nc}, \hat{d}] \quad (15)$$

The RELS algorithm is given as follows:

$$\hat{\theta}(k) = \hat{\theta}(k-1) + p(k-1) \cdot \phi(k) \cdot \mu(k) \cdot \xi(k) \quad (16)$$

$$p(k) = (p(k-1) - p(k-1) \cdot \phi(k) \cdot \phi^T(k) p(k-1) \cdot \mu(k))/\lambda(k) \quad (17)$$

$$\mu(k) = 1.0/(\lambda(k) + \phi^T(k) \cdot p(k-1) \cdot \phi(k)) \quad (18)$$

$$\xi(k) = y(k) - \hat{\theta}^T(k-1) \cdot \phi(k) \quad (19)$$

where $\lambda(k)$ is the forgetting factor and is associated with the rate of convergence of $\theta(k)$. The forgetting factor $\lambda(k)$ falls within the following range:

$$0.90 \leq \lambda(k) \leq 1.0 \quad (20)$$

The RELS algorithm is started with the following initial value.

$$\hat{\theta}(0) = 0 \quad (21)$$

$$p(0) = \nu I \quad (22)$$

where $\nu$ is a positive large number, and I is a unit matrix.

When the value $\hat{\theta}(k)$ is obtained, the pulse transfer function $\hat{H}(z^{-1})$ is identified as follows:

$$\hat{H}(z^{-1}) = \{z^{-l} \cdot (\hat{b}_1 z^{-1} + \ldots + \hat{b}_{nb} z^{-nb})/(1 + \hat{a}_1 z^{-1} + \ldots + \hat{a}_{na} z^{-na})\}$$

Every sampling time the pulse transfer function $H(z^{-1})$ is produced from the pulse transfer function identifying circuit 32 for each sampling period.

The S-transfer function calculator 34 calculates parameters $g_0$, $g_1$, $g_2$ and $g_3$ of the S-transfer function obtained by denominator polynomial expression in accordance with the parameters $\hat{a}_i$ (i = 1 to na) and $\hat{b}_i$ (i = 1 to nb) of the transfer function $H(z^{-1})$ as follows:

$$H_p(s) = 1/(g_0 + g_1 s + g_2 s^2 + g_3 s^3 + \ldots) \quad (23)$$

In particular, the term $z = \exp(\tau s)$ is substituted into the transfer function $\hat{H}(z^{-1})$, and the exponential terms are Maclaurin-expansion, so that the parameters $g_0$, $g_1$, $g_2$ and $g_3$ are obtained as follows:

$$g_0 = D_0 \quad (24)$$

$$g_1 = D_1 - (\tau/2)D_0 \quad (25)$$

$$g_2 = D_2 - (\tau/2)D_1 - (\tau^2/12)D_0 \quad (26)$$

$$g_3 = D_3 - (\tau/2)D_2 - (\tau^2/12)D_1 \quad (27)$$

for $D_0 = A_0/B_0$
$D_1 = (A_1 - C_0B_1)/B_0$
$D_2 = (A_2 - C_0B_2 - C_1B_1)/B_0$
$D_3 = (A_3 - C_0B_3 - C_1B_2 - C_2B_1)/B_0$ for $A_0 = 1 + \sum_{i=1}^{na} \hat{a}_i$ $A_1 = -\tau \sum_{i=1}^{na} i \cdot \hat{a}_i$

...

$A_n = \{(-\tau)^n/n!\} \sum_{i=1}^{na} i^n \cdot \hat{a}_i$ $B_0 = \sum_{i=1}^{nb} \hat{b}_i$ $B_1 = -\tau \sum_{i=1}^{nb} i \cdot \hat{b}_i$

...

$B_n = \{(-\tau)^n/n!\} \sum_{i=1}^{nb} i^n \cdot \hat{b}_i$

The S-transfer function $H_p(s)$ is produced from the S-transfer function calculator 34 for each sampling period. As the pulse transfer function $\hat{H}(z^{-1})$ is identified accurately, the parameter value of the S-transfer function $H_p(s)$ converges to constant value. For this reason, the identification-complete detector 42 produces a convergence detection signal by determining the convergence of the parameter volume as follows:

$$|g_i(k) - g_i(k-1)| \leq \text{CLASS} \tag{28}$$

for i=0 to 3
wherein equation (28) is satisfied for all i (=0 to 3).

Values such as 0.001, 0.005 and 0.01 are set as a standard CLASS value. When equation (28) is satisfied, the identifying function is stopped.

The digital PID control parameter calculator 36 calculates the digital PID control parameters Kc, Ti and Td in the following manner. The S-transfer function $G_c(s)$ of the digital PID controller 12 is given as follows:

$$\begin{aligned} G_c(s) &= G(z^{-1})/F(z^{-1}) \mid z = \exp(\tau s) \cdot (1 - e^{-\tau s}/\tau s) \\ &= [Kc(1 + \tau/Ti + Td/\tau) - Kc(1 + 2Td/\tau)e^{-\tau s} + \\ &\quad \{(Kc \cdot Td)/\tau\}e^{-2\tau s}]/\tau s \\ &= [g_{c0} + g_{c1} \cdot (1 - e^{-\tau s})/\tau + g_{c2} \cdot \{(1 - e^{-\tau s})/\tau\}^2 + \ldots ]/s \end{aligned} \tag{29}$$

A total S-transfer function W(s) with respect to the step disturbance d(t) is obtained from the S-transfer functions $G_c(s)$ and $H_p(s)$ as follows:

$$W(s) = s/[g_{c0} + g_{c1}s + \{g_{c2} - (\tau/2)g_{c1}\}s^2 + \ldots + s(g_0 + g_1s + g_2s^2 + g_3s^3 + \ldots)] \tag{30}$$

The denominator of the S-transfer function W(s) of equation (30) is matched with the reference model $W_r(s)$, so that the PID control parameters Kc, Ti and Td are obtained. According to this invention, a model $W_r(s)$ is selected as a reference model by rearranging a model $W_1(s)$ allowing 10% overshoot as described in the prior art of this invention:

$W_1(s) = 1/\{1 + \sigma s + (\frac{1}{2})(\sigma s)^2 + (3/20)(\sigma s)^3 + (3/100)(\sigma s)^4 + \ldots\}$ and a model $W_2(s)$ allowing no overshoot:

$W_2(s) = 1/\{1 + \sigma s + (\frac{3}{8})(\sigma s)^2 + (1/16)(\sigma s)^3 + (1/256)(\sigma s)^4 + \ldots\}$ as a model $W_r(s)$ using the response shape parameter α as follows:

$$W_r(s) = 1/\{1 + \sigma s + \alpha_2(\sigma s)^2 + \alpha_3(\sigma s)^3 + \alpha_4(\sigma s)^4 + \ldots\} \tag{31}$$

for $\alpha_2 = (\frac{1}{2})\alpha + (\frac{3}{8})(1-\alpha)$ $\alpha_3 = (3/20)\alpha + (1/16)(1-\alpha)$ $\alpha_4 = (3/100)\alpha + (1/256)(1-\alpha)$ If α=1, then the reference model $W_r(s)$ becomes the model $W_1(s)$ which allows 10% overshoot. If α=0, the reference model $W_r(s)$ becomes the model $W_2(s)$ which allows no overshoot. Furthermore, if α takes a value in a range between 0 and 2.0, the reference model $W_r(s)$ is a model having a given response shape. It should be noted that the response shape is defined as the response (i.e., process output signal) with respect to step changes in the set-point signal, and that σ is the time scale conversion factor.

By matching equation (30) with equation (31), the following equations are obtained:

$$g_0 + g_{c1} = \sigma g_{c0} \tag{32}$$

$$g_1 + g_{c2} - (\tau/2)g_{c1} = \alpha_2 \sigma^2 g_{c0} \tag{33}$$

$$g_2 + g_{c3} - \tau g_{c2} + (\tau^2/6)g_{c1} = \alpha_3 \sigma^3 g_{c0} \tag{34}$$

$$g_3 + g_{c4} - (3/2)\tau g_{c3} + (7/12)\tau^2 g_{c1} - (\tau^4/24)g_{c1} = \alpha_4 \sigma^4 g_{c0} \tag{35}$$

wherein $g_{c0}$, $g_{c1}$ and $g_{c2}$ have the following relations with the control parameters Kc, Ti and Td, respectively:

$$Kc = g_{c1} \tag{36}$$

$$Ti = g_{c1}/g_{c0} \tag{37}$$

$$Td = g_{c2}/g_{c1} \tag{38}$$

The parameters $g_{c0}$, $g_{c1}$ and $g_{c2}$ are calculated by using a positive minimum root σ* of an equation regarding σ which is obtained by eliminating the design parameters.

In the PI control mode, since the parameters $g_{c0}$, $g_{c1}$ and σ are the design parameters, the parameters $g_{c0}$, $g_{c1}$ and $g_{c2}$ are obtained by the minimum root σ* of the following equation which is obtained by the equations (32) to (34):

$$(g_1 + (\tau/2)g_0)\alpha_3\sigma^2 + (-g_2 + (\tau^2/6)g_0)\alpha_2\sigma - (g_2/2 + \tau g_1/6)\tau = 0 \tag{39}$$

therefore, $$g_{c0} = (g_1 + (\tau/2)g_0)/\sigma^*(\alpha_2\sigma^* + \tau/2) \tag{40}$$

$$g_{c1} = g_{c0}\sigma^* - g_0 \tag{41}$$

$$g_{c2}=0 \quad (42)$$

Equations (40) to (42) are substituted into equations (36) to (38) to eliminate $g_{c0}$, $g_{c1}$ and $g_{c2}$, thereby obtaining the PI control parameters Kc and Ti.

In the PID control mode, since the parameters $g_{c0}$, $g_{c1}$, $g_{c2}$ and $\sigma$ are the design parameters, the parameters $g_{c0}$, $g_{c1}$ and $g_{c2}$ are obtained by the minimum root $\sigma^*$ of the following equation which is obtained by the equations (32) to (35):

$$(g_2 + \tau g_1 + \tau^2 g_0)a_4\sigma^3 + (-g_3 + (7/12)\tau g_1 + \quad (43)$$
$$(\tau^3/4)g_0)a_3\sigma^2 + (-g_3 - (7/12)\tau g_2 +$$
$$(\tau^3/18)g_0)\tau a_2\sigma + (-g_3/3 - (\tau/4)g_2 - (\tau^2/18)g_1)\tau^2 = 0$$

therefore, $$g_{c0}=(g_2+\tau g_1+(\tau^2/3)g_0)/\{\sigma^*(a_3\sigma^{*2}+\tau a_2\sigma^*+\tau^2/3)\} \quad (44)$$

$$g_{c1}=g_{c0}\sigma^*-g_0 \quad (45)$$

$$g_{c2}=a_2\sigma^{*2}g_{c0}+(\tau/2)g_{c1}-g_1 \quad (46)$$

By substituting equations (44) to (46) into equations (36) to (38), the PID parameters Kc, Ti and Td are obtained.

When the dynamic characteristics of the process are identified by the above operation, the digital PID control parameter calculator 36 calculates the PID control parameters of the PID controller 12 so as to provide a good suppressing response against a disturbance. However, if the set point is changed in a stepwise manner, the response of the closed loop control system has a large overshoot and a long settling time. As a result, the control system does not always show a good response to the set point. In order to eliminate the above defect, the transfer function $H_f(z^{-1})$ of the set-point filter 16 is calculated such that the S-transfer function $Y(s)/R(s)$ from the set-point signal r(t) to the process output signal y(t) is matched with the reference model $W_r(s)$. For this purpose, the zeros of the transfer function $Y(S)/R_0(S)$ from $r_0(t)$ to the process signal y(t) are cancelled by the poles of the pulse transfer function $H_f(z^{-1})$ of the set-point filter. If the samplers 14 and 18 for respectively sampling the set-point signal and the process signal, the set-point filter 16, and the digital PID controller 12 are synchronized with each other at a given sampling period $\tau$, an S-transfer function $H(e^{\tau s})$ of the set-point filter 16 is given as follows:

$$H(e^{\tau s})=1/\{1+(g_{c1}/g_{c0})((1-e^{-\tau s})/\tau)+(g_{c2}/g_{c0})((1-e^{-\tau s})/\tau)^2+\ldots\} \quad (47)$$

The pulse transfer function $H_f(z^{-1})$ is expressed using equations (37) and (38) and substituting $e^{\tau s}=z$ in equation (47), as follows:

$$H_f(z^{-1})=h_3/(1+h_1z^{-1}+h_2z^{-2}) \quad (49)$$

for $$h_1=-((Ti/\tau)+2(TiTd)/\tau)/(1+(Ti/\tau)+(TiTd)/\tau^2)) \quad (50)$$

$$h_2=((TiTd)/\tau^2)/(1+(Ti/\tau)+(TiTd)/\tau^2)) \quad (51)$$

$$h_3=1/(1+(Ti/\tau)+(TiTd)/\tau^2)) \quad (52)$$

Figure 3B:
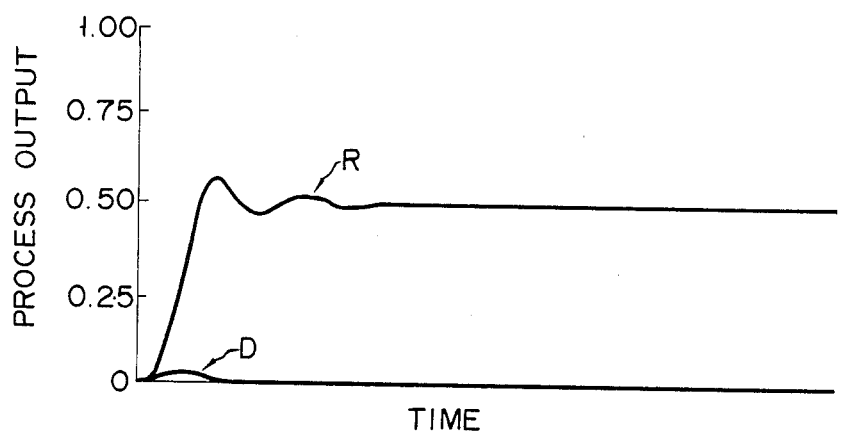

The set-point filter 16 is used in the manner as described above, so that mismatching with respect to the set point can be cancelled when the PID controller has a good control performance against the disturbance. Therefore, the control system having a good response to the set point and a good suppressing response against a disturbance can be obtained. FIGS. 3A and 3B show the response waveforms from the control system in cases where the set-point filter is not used and is used therein. An R waveform is obtained when the set point changes in a stepwise manner. A D waveform is obtained when the disturbance changes in a stepwise manner.

As previously described, the response shape can arbitrarily change in accordance with a change in the response shape parameter $\alpha$. FIG. 4 shows the response shape of the control system with respect to stepwise changes in the set point when the response shape parameter $\alpha$ changes after the filter parameter is determined.

An operation will be described wherein identification/tuning is completed, and the PID parameters are reidentified/retuned during the operation of the process. The model error detector 44 detects a change in dynamic characteristics of the process in accordance with a model error $\eta^*(k)$ as follows:

$$\eta^*(k)=\hat{y}^*(k)-y^*(k) \quad (53)$$

where $y^*(k)$ is the predicted value of the process signal $y^*(k)$ in accordance with the process parameters $\hat{a}_i(i=1$ to na) and $\hat{b}_i(i=1$ to nb) and the DC value $\hat{d}$ and is given by the following equation:

$$\hat{y}^*(k) = -\sum_{i=1}^{na} \hat{a}_i y^*(k-i) + \sum_{i=1}^{nb} \hat{b}_i u^*(k-i) + \hat{d} \quad (54)$$

It is assumed that the noise is $\epsilon^*(k)$, then the actual process signal $y^*(k)$ is given as follows:

$$y^*(k) = -\sum_{i=1}^{na} a_i y^*(k-i) + \sum_{i=1}^{nb} b_i u^*(k-i) + \epsilon^*(k) + \sum_{i=1}^{nc} c_i \epsilon^*(k-i) + d \quad (55)$$

When equations (54) and (55) are substituted into equation (53), the model error $\eta^*(k)$ is given as follows:

$$\eta^*(k) = -\sum_{i=1}^{na} \delta a_i y^*(k-i) + \sum_{i=1}^{nb} \delta b_i u^*(k-i) + \delta d - \epsilon^*(k) - \sum_{i=1}^{nc} c_i \epsilon^*(k-i) \quad (56)$$

for $$\delta a_i=\hat{a}_i-a_i$$
$$\delta b_i=\hat{b}_i-b_i$$
$$\delta d=\hat{d}-d$$

It is thus found according to equation (56) that the model error $\eta^*(k)$ includes a change in the process parameters. If the noise $\epsilon^*(k)$ has an average value of 0 and is regarded as white noise, the expectation of equation (56) is zero when the dynamic characteristics do not change. Otherwise, the prediction cannot be zero, thereby allowing detection of a change in process dynamic characteristics. However, it is impossible to calculate the expectation $E[\eta^*(k)]$, so that the short-period average value $\overline{\eta^*}(k)$ is used instead.

$$\overline{\eta^*}(k) = (1/J) \sum_{i=1}^{J} \eta^*(k + 1 - i) \quad (57)$$

for a value of J can be used from a range between 4 and 8

The short-period average value $\eta^*(k)$ of the above model error is compared with an allowable value $L_1$, thereby monitoring the process dynamic characteristics as follows:

$$|\overline{\eta^*}(k)| > L_1 \quad (58)$$

The allowable value $L_1$ is obtained by the following norm of the characteristic parameter vector:

$$L_1 = \|\phi_1(k)\| \cdot \|\hat{\theta}_1\| \cdot (\|\delta\theta_1\| / \|\hat{\theta}_1\|) \quad (59)$$

for $$\phi_1(k) = [-y^*(k-1), \ldots, -y^*(k-na), u^*(k-1), \ldots, u^*(k-nb), 1]^T \quad (60)$$

$$\delta\theta_1 = (\delta a_1, \ldots, \delta a_{na}, \delta b_1, \ldots, \delta b_{nb}, \delta d)^T \quad (61)$$

$$\hat{\theta}_1 = (\hat{a}_1, \ldots, \hat{a}_{na}, \hat{b}_1, \ldots, \hat{b}_{nb}, \hat{d})^T \quad (62)$$

$$\|\phi_1(k)\| = \left( \sum_{i=1}^{na} y^*(k-i)^2 + \sum_{i=1}^{nb} u^*(k-i)^2 + 1 \right)^{\frac{1}{2}} \quad (63)$$

$$\|\hat{\theta}_1\| = \left( \sum_{i=1}^{na} \hat{a}_i^2 + \sum_{i=1}^{nb} \hat{b}_i^2 + \hat{d}^2 \right)^{\frac{1}{2}} \quad (64)$$

The term $(\|\delta\theta_1\| / \|\theta_1\|)$ of equation (59) indicates a rate of change in process dynamic characteristics. By setting the extent of the allowable change to be 10% or 30%, the allowable value $L_1$ is obtained.

However, as may be apparent from equation (56), the differential component of the DC value is included in the model error $\eta^*(k)$. Therefore, not only when the process dynamic characteristics change but when the DC value changes due to the disturbance, the short-period average value $|\overline{\eta^*}(k)|$ may exceed the allowable value $L_1$. However, when the DC value is changed by the disturbance, this change can be regulated by the PID controller 12. As a result, reidentification need not be performed. It should be noted that reidentification is required only when the process dynamic characteristics change.

According to equation (56), when the process dynamic characteristics change (i.e. when $\delta a_i$ and $\delta b_i$ are not respectively zero), it is found that the model error $\eta^*(k)$ greatly changes in accordance with a change in the input signal $u^*(k-1)$. However, when the disturbance is entered (i.e., when $\delta a_i$ and $\delta b_i$ are respectively zero and $\delta d$ is not zero), it is found that the model error $\eta^*(k)$ does not change even if the input signal $u^*(k-1)$ changes. For this reason, when equation (58) is detected to be satisfied by the model error detector 44, the pulse signal $\Delta r^*(k)$ is generated from the pulse generator 46 and is superposed on the set-point signal $r_0^*(k)$. The model error change calculator 48 detects a change in the model error in the following manner:

$$|\Delta\overline{\eta^*}(k)| = |\overline{\eta^*}(k) - \overline{\eta^*}(k - k_T)| > L_2 \quad (65)$$

for $k_T = g_1/\tau$ (detection time)

The allowable value $L_2$ can be obtained in the same manner as the allowable value $L_1$ as follows:

$$L_2 = \|\hat{\theta}_1\| \cdot \|\Delta\phi_1(k)\| \cdot (\|\delta\theta_1\| / \|\hat{\theta}_1\|) \quad (66)$$

for $$\Delta\phi_1(k) = [y^*(k-1) - y^*(k - k_T - 1), \ldots, \quad (67)$$
$$y^*(k - na) - y^*(k - k_T - na),$$
$$u^*(k-1) - u^*(k - k_T - 1), \ldots,$$
$$u^*(k - nb) - u^*(k - k - nb)]^T$$

for $\|\delta\theta_1\| / \|\hat{\theta}_1\|$ : 5, 10 or 15%

The allowable value $L_2$ is obtained in consideration of the amplitude of the pulse signal. When equation (65) is satisfied, the model error change calculator 48 drives the restart circuit 52, so that the identification section 30 restarts the operation. However, if equation (65) is not satisfied, it is determined that the process dynamic characteristics do not change. A correction value is then supplied to the model error detector 44 so as to decrease the model error to be lower than the allowable value $L_1$. In other words, $\overline{\eta^*}(k)$ is subtracted from d in equation (55). FIGS. 5A to 5D are timing charts of the signal of the short-period average value $|\overline{\eta^*}(k)|$ of the model error, the pulse signal $\Delta r^*(k)$, the signal of change $|\Delta\overline{\eta^*}(k)|$ of the model error, and the start signal supplied from the restart circuit 52 to the identification section 30, respectively.

In the digital PID process control apparatus for constantly controlling the process with the optimum control parameters according to the embodiment as described above, the dynamic characteristics of the process are detected during operation. If the dynamic characteristics change, the identification/tuning function is restarted, thereby constantly controlling the process with optimum control parameters. For this reason, supervisors and related equipment for monitoring the dynamic characteristics of the process can be eliminated. Furthermore, since the identification/tuning function is automatically restarted, the control parameters can be tuned at a high speed with respect to changes in dynamic characteristics of the process. In addition to this advantage, the PID controller controls the control system with a good suppressing response against a disturbance, and the set-point filter is arranged to have a good tracking response to the set point. Therefore, a control system having a good response to the set point and a good suppressing response against a disturbance can be obtained. Furthermore, the reference model is expressed using the response shape parameter, so that the response shape of the control system can be arbitrarily modified only by modifying the shape parameter $\alpha$, thereby providing a variety of process applications.

The present invention is not limited to the above embodiment. Various changes and modifications may be made within the spirit and scope of the present invention. The persistently exciting signal as the identification signal is not limited to the M-sequence signal. A white noise signal or a pseudo-random binary signal may be used as the persistently exciting signal. Any other algorithm such as a recursive maximum likelihood algorithm and a recursive instrumental variable algorithm may be used as the identifying method of the pulse transfer function in place of the recursive extended least squares algorithm so as to obtain an unbiased estimate. Furthermore, any other technique may be adopted to obtain an S-transfer function from the pulse transfer function: for example, a technique wherein an S-transfer function is approximated to a second-order delayed system which has dead time in accordance with the step response of the pulse transfer function, this technique being adapted in the prior application described at the beginning; and a technique wherein an S-transfer function is obtained by Laplace-transforming the waveform represented by a line which is obtained by sequentially connecting the step response components. Furthermore, the output pulse signal $\Delta r^*(k)$ of the characteristic change detection section 50 may be superposed on the input signal to the set-point filter 16 or the output signal from the digital PID controller 12 so as to obtain the same effect as in the above embodiment.

What we claim is:

1. A digital PID process control apparatus comprising:
   digital PID controlling means for calculating a control signal as a process input signal in accordance with PID control parameters and a difference between a set-point signal and a process signal as a process output signal so as to supply the control signal to a process;
   identifying means for identifying a pulse transfer function of the process in accordance with the process input signal and the process output signal while superposing a persistently exciting signal as an identification signal on the control signal and supplying a superposed signal to the process, and for calculating an S-transfer function of the process in accordance with the identified pulse transfer function;
   tuning means for tuning the PID control parameters of said digital PID controlling means in accordance with the S-transfer function;
   identification-complete detecting means for detecting a convergence of the S-transfer function so as to stop generating the persistently exciting signal by said identifying means;
   characteristic change detecting means for detecting a model error of the process in accordance with the process input signal, the process output signal and the pulse transfer function, and for changing the set point signal in a pulse form; and
   restarting means for detecting a change in the model error when the set point signal is changed in the pulse form and for restarting generation of the persistently exciting signal by said identifying means.

2. An apparatus according to claim 1, in which said digital PID controlling means produces the control signal $u_0^*(k)$ using a control error $e^*(k)$ ($k=t/\tau$ where t is a real time and $\tau$ is a sampling period of said apparatus) between the process output signal and the set-point signal, and using PID control parameters Kc, Ti and Td, in accordance with an algorithm as follows:

$$u_0^*(K) = ]u_0^*(k-1) + Kc\{(e^*(k) - e^*(k-1)) +$$
$$(\tau/Ti)e^*(k) + (Td/\tau)(e^*(k) - 2e^*(k-1) + e^*(k-2))\}.$$

3. An apparatus according to claim 2, in which said digital PID controlling means comprises a set-point filter for receiving the set-point signal, an adder for calculating the control error in accordance with an output signal from said set-point filter and the process output signal, and a digital PID controller for calculating the control signal in accordance with the control error and the PID control parameters.

4. An apparatus according to claim 1, in which said identifying means superposes a maximum length sequence signal on the control signal.

5. An apparatus according to claim 1, in which said identifying means identifies the pulse transfer function in accordance with a recursive extended least squares algorithm.

6. An apparatus according to claim 1, in which said identifying means calculates coefficients of a denominator polynomial of S-transfer function from coefficients of the pulse transfer function.

7. An apparatus according to claim 1, in which said tuning means determines the PID control parameters by matching an S-transfer function of a reference model with an S-transfer function of the process from a disturbance to the process output signal.

8. An apparatus according to claim 7, in which said tuning means uses a reference model $W_r(s)$ expressed by a response shape parameter $\alpha$ and a time scale conversion factor $\sigma$ as follows:

$$W_r(s) = 1/\{1 + \sigma s + \alpha_2(\sigma s)^2 + \alpha_3(\sigma s)^3 + \alpha_4(\sigma s)^4 + \ldots\}$$

for $$\alpha_2 = \alpha/2 + 3(1-\alpha)/8$$

$$\alpha_3 = 3\alpha/20 + (1-\alpha)/16$$

$$\alpha_4 = 3\alpha/100 + (1-\alpha)/256.$$

* * * * *